United States Patent [19]

Kubomiya

[11] Patent Number: 5,219,050
[45] Date of Patent: Jun. 15, 1993

[54] EDDY CURRENT BRAKING APPARATUS

[75] Inventor: Tomoyuki Kubomiya, Kawasaki, Japan

[73] Assignee: Isuzu Motors Ltd., Tokyo, Japan

[21] Appl. No.: 825,902

[22] Filed: Jan. 27, 1992

[30] Foreign Application Priority Data

Jan. 31, 1991 [JP] Japan .................................. 3-032034

[51] Int. Cl.$^5$ .............................................. F16F 15/03
[52] U.S. Cl. ..................................... 188/267; 188/164; 192/84 PM; 335/288; 335/306
[58] Field of Search ........................ 188/164, 165, 267; 192/84 PM; 335/288, 306

[56] References Cited

U.S. PATENT DOCUMENTS

| 4,482,034 | 11/1984 | Baermann | 188/165 |
| 4,896,754 | 1/1990 | Carlson et al. | 188/267 X |
| 5,064,029 | 11/1991 | Araki et al. | 188/164 X |

FOREIGN PATENT DOCUMENTS 1525516 4/1968 France .................. 188/164

Primary Examiner—George E. A. Halvosa
Attorney, Agent, or Firm—John E. Toupal; Harold G. Jarcho

[57] ABSTRACT

An eddy-current braking apparatus including a brake drum; an annular support disposed within the brake drum; a plurality of shafts mounted for rotation on the support and each disposed substantially parallel to the axis of the drum the shafts being spaced apart in an annular array on the support; and a permanent magnet fixed to each of the shafts directly adjacent to the brake drum and each having opposite polarity poles, disposed on opposite sides of the shaft. Also included is a drive mechanism for producing rotation of the shafts between braking positions wherein the magnets produce magnetic circuits including the brake drum and non-braking positions wherein the magnets produce magnetic circuits substantially excluding the brake drum.

14 Claims, 3 Drawing Sheets

EDDY CURRENT BRAKING APPARATUS

BACKGROUND OF THE INVENTION

This invention relates generally to a braking system for vehicles and, more particularly to such a braking system employing eddy current generating rotatable magnets.

Disclosed in Japanese Patent Application No. 218498/1989, is an eddy-current type braking system in which a magnet supporting ring retains a number of permanent magnets in an equally spaced relationship juxtaposed internally of a brake drum. The magnet supporting ring is axially moved between a braking position in which the magnets exert a magnetic field on the inner cylindrical surface of the brake drum and a non-braking position in which the magnets do not exert a magnetic field on the inner cylindrical surface of the brake drum. In this eddy-current type reduction gear, an axial dimension of the fixed frame is relatively long producing difficulties in certain cases as when a reduction gear together with a parking brake are arranged in a narrow mounting space of a connecting portion between an output rotational shaft of a transmission and a propeller shaft under the floor of a vehicle.

The object of the present invention, therefore, is to provide an eddy-current type braking apparatus exhibiting an axial dimension shorter than prior art devices.

SUMMARY OF THE INVENTION

The invention is an eddy-current braking apparatus including a brake drum; an annular support disposed within the brake drum; a plurality of shafts mounted for rotation on the support and each disposed substantially parallel to the axis of the drum, the shafts being spaced apart in an annular array on the support; and a permanent magnet fixed to each of the shafts directly adjacent to the brake drum and each having opposite polarity poles disposed on opposite sides of the shaft. Also included is a drive mechanism for producing rotation of the shafts between braking positions wherein the magnets produce magnetic circuits including the brake drum and non-braking positions wherein the magnets produce magnetic circuits substantially excluding the brake drum. The use of rotatable magnets allows the apparatus to be mounted in confined spaces.

According to one feature of the invention, opposite polarity poles of each magnet are oriented substantially radially within the brake drum when in their braking positions, the orientation of the poles in directly adjacent magnets are opposite, and the opposite polarity poles of the magnets are aligned substantially parallel to the brake drum in their non-braking positions. This arrangement provides the desired magnetic circuits for braking and non-braking conditions.

In one embodiment of the invention, the adjacent poles of annularly directly adjacent magnets are of opposite polarity with the shafts in non-braking positions, a magnetic shunt is disposed between each annularly adjacent pair of magnets and provides a magnetic circuit between opposite polarity poles thereof, the support comprises an outer non-magnetic ring disposed between the magnets and the brake drum, and an inner magnetic ring disposed within the annular array, and the drive mechanism produces opposite sense rotation of annularly directly adjacent pairs of the shafts. This arrangement conveniently produces the desired magnetic circuits.

According to features of the above embodiment, the drive mechanism comprises a first annular gear disposed within the annular array, a second annular gear disposed outside the annular array, a plurality of first drive gears coupled between the first annular gear and given alternating shafts in the annular array, and a plurality of second drive gears coupled between the second annular gear and other alternating shafts in the annular array. This gear configuration provides desired contra rotation of adjacent shafts.

According to features of another type of the above embodiment, the drive mechanism comprises a plurality of first gears, one coupled to and projecting outwardly from each alternate shaft in the array; a plurality of second gears, one coupled to and projecting inwardly from each alternate shaft in the array not coupled to a first gear; and a flexible elongated drive means operatively engaged with each of the first and second gears. This arrangement also produces contra rotation of adjacent shafts.

According to another embodiment of the invention, the apparatus includes a magnetic shunt providing a magnetic path between opposite poles of each magnet and extending radially inwardly thereof; the support comprises an outer non-magnetic ring disposed between the magnets and the brake drum, and an inner magnetic ring disposed within the annular array; and the adjacent poles of annularly directly adjacent magnets are of like polarity with the shafts in non-braking positions. In this embodiment the drive mechanism produces a common sense of rotation for all of the shafts.

According to further features of the invention, the apparatus includes a first plurality of pole pieces each disposed adjacent one side of a different one of the magnets, and a second set of pole pieces each disposed adjacent to an opposite side of each magnet; and each said magnet is a hollow cylinder surrounding one of the shafts. The pole pieces enhance the effectiveness of the magnetic circuits and the cylindrical magnets are easily mounted on the rotary shafts.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
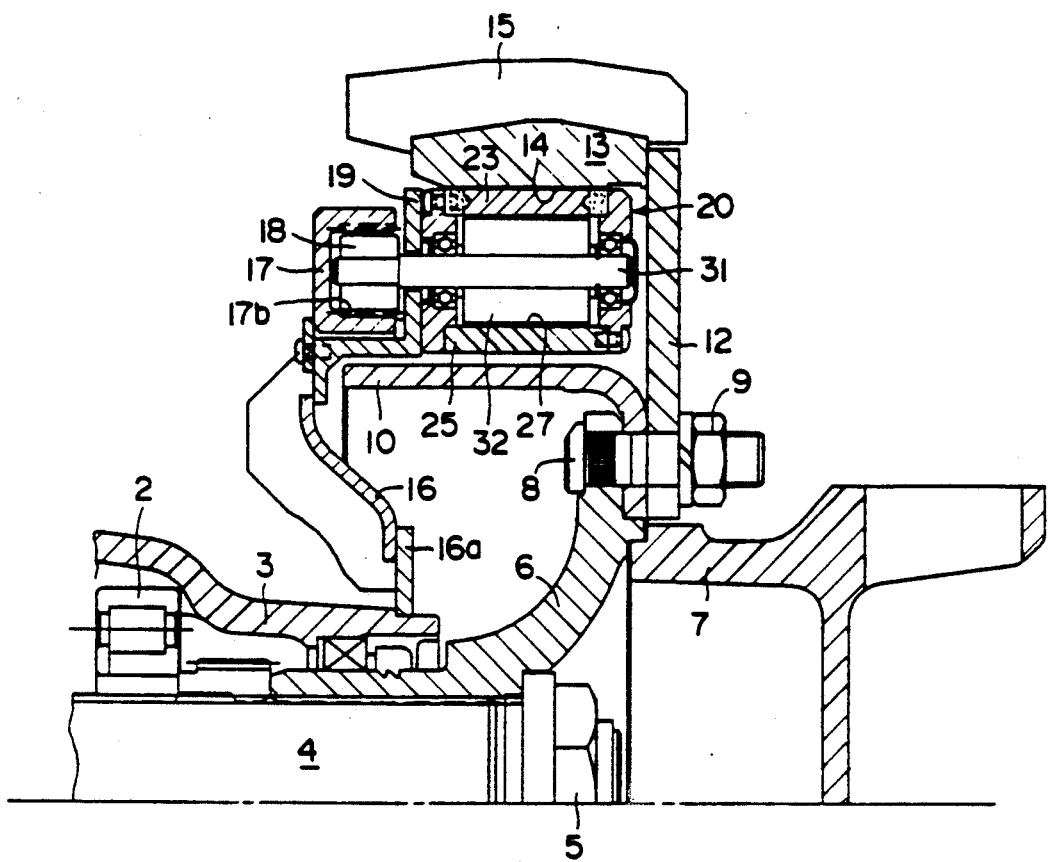
FIG. 1 is a side sectional view of an eddy-current type reduction gear according to the present invention.

An eddy-current type reduction the present invention is arranged at a rear end of a vehicle transmission. As shown in FIG. 1, a coupling flange 6 is spline-fitted in and fastened, with a nut 5 to an output rotational shaft 4. Supporting the shaft 4 on a rear end wall of a gear box 3 is a bearing 2. An end wall of a well-known parking brake drum 10 and an end wall 12 of a brake drum 13 of a reduction gear are juxtaposed on the coupling flange 6 and fastened by bolts 8 and nuts 9. Connecting the rotational shaft 4 and a well-known propeller shaft is a yoke 7 of a universal joint fitted into the coupling flange 6 and connected by means of bolts, not shown. The brake drum 13 is provided in its outer peripheral wall with a number of outwardly projecting, circumferentially spaced apart cooling fins 15.

An annular hollow supporting ring 20 retains a number of hollow cylindrical magnets 32, each arranged in a space between an inner cylindrical surface 14 of a brake drum 13 and an outer peripheral surface of the parking brake drum 10. Retaining the magnetic supporting ring 20 is a circular frame plate 16 having a reinforcing rib and secured to a rear end wall of the gear box 3 by a mounting plate 16a. The supporting ring 20 is secured to a right end surface of the frame plate 16 by a supporting plate 19 having an L-shaped section, and a driving ring 17 having a C-shaped section is mounted for reversible rotation adjacent to a left wall surface of the supporting plate 19. Formed by the supporting ring 20 made of non-magnetic material are a plurality of equally spaced apart cylindrical space portions 27 each receiving one of the magnets 32. A rotational shaft 31 is surrounded by and rotatably fixed to each magnet 32. The shafts 31 are arranged in an annular array with each shaft 31 parallel to the axis of the drum surface 14. Coupled to an end of each alternating shaft 31 is a first inwardly directed, arcuate gear 18 projecting into the driving ring 17. Ends of opposite alternating shafts 31 are coupled to second, outwardly directed arcuate gears 18a. The first arcuate gears 18 engage a first annular gear 17b formed by one inner cylindrical surface of the driving ring 17 while a second annular gear 17a formed by another inner surface thereof engages the second arcuate gears 18a.

Figure 2:
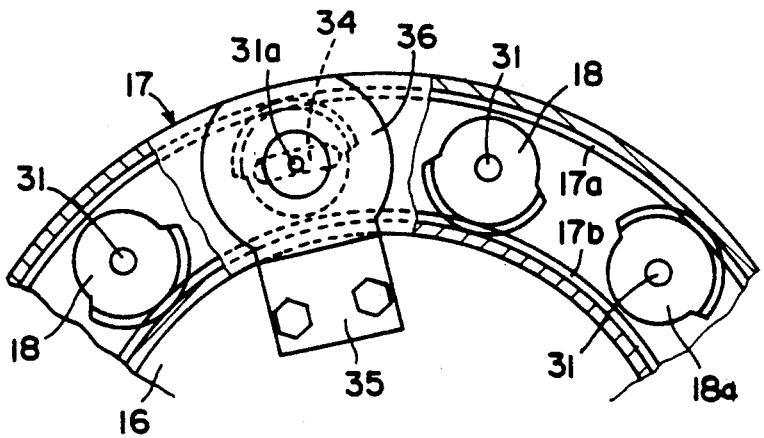
FIG. 2 is a front sectional view of means for rotating and driving magnets in the reduction gear.
Figure 3:
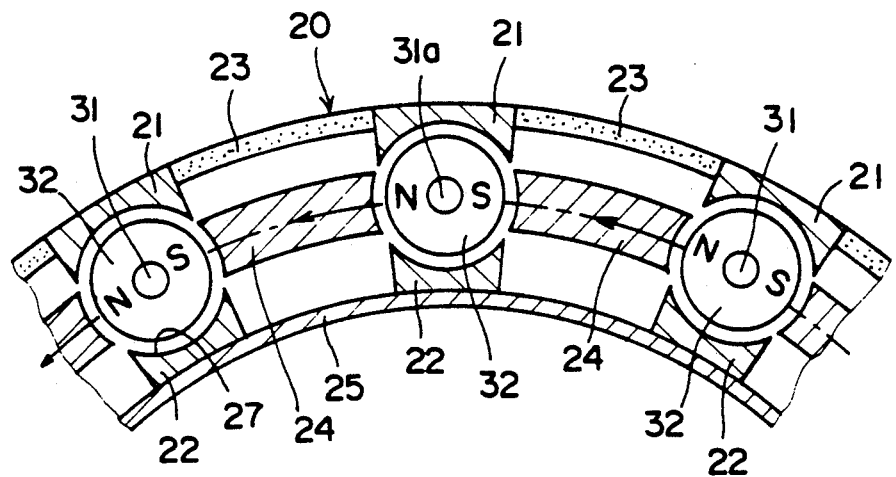
FIG. 3 is a front sectional view of a magnet supporting ring.
Figure 4:
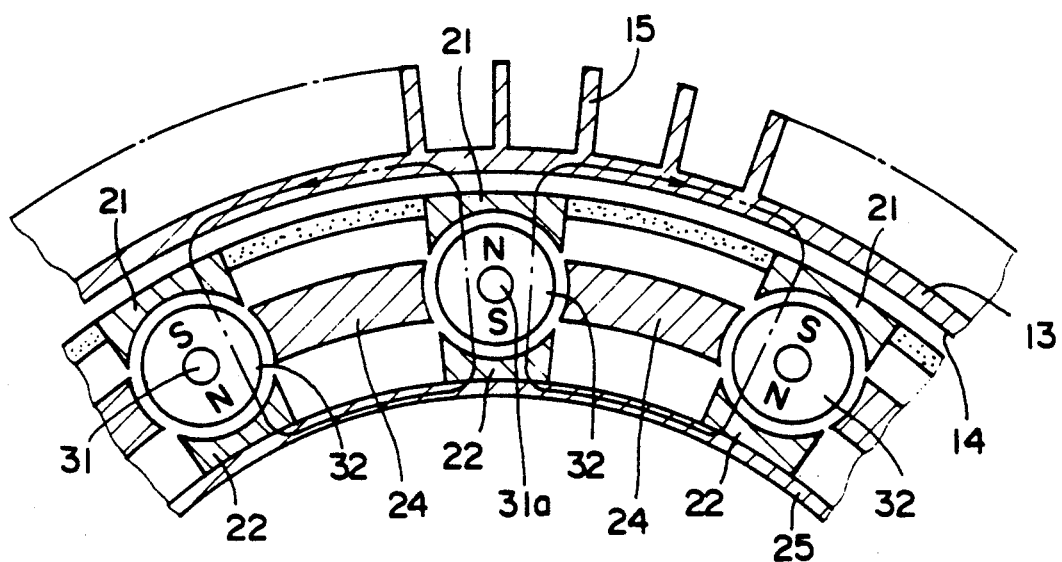
FIG. 4 is a front sectional view showing the relationship between a brake drum and magnets during braking.

As shown in FIG. 2, a drive shaft extension 31a on one of the rotational shafts 31 extends outwardly through a formed circular slot 34 provided in the end wall of the driving ring 17. Connected to the shaft extension 31a is an electric motor 36 fixed to the frame plate 16 by a supporting plate 35. Accordingly, when the rotational shaft 31a is rotated a quarter turn in either of opposite senses by the electric motor 36, the driving ring 17 also rotates driving the arcuate gears 18 in a direction opposed to the direction in which the arcuate gears 18a are driven. In response thereto, the positions of the magnetic poles of the magnets 32 are changed. The shafts 31 are rotated between braking positions shown in FIG. 4 and non-braking positions shown in FIG. 3. In the non-braking positions of the shafts 31, the magnets 32 are positioned such that their opposite N and S poles are annularly aligned parallel to the drum surface 14 and with adjacent poles of directly annularly adjacent magnets of opposite polarity (FIG. 3). Conversely, in the braking positions of the shafts 31, the magnets 32 are positioned such that their opposite N and S poles are oriented radially with respect to the lower surface 14 (FIG. 4).

The magnet supporting ring 20 includes a non-magnetic outer cylinder 23 and a magnetic inner cylinder 25 joined by a pair of annular end wall plates, and supporting, respectively, pairs of magnetic pole members 21 and 22 formed of a ferromagnetic material with each pair straddling one of the magnets 32. Preferably, the magnetic pole members 21 are embedded into an opening of the outer cylinder 23. A magnetic shunt member 24 formed of a ferromagnetic material is disposed between each pair peripherally arranged magnets 32 and between the outer cylinder 23 and the inner cylinder 25. Between the outer cylinder 23 and each shunt member 24 and between the inner cylinder 25 and each shunt member 24 cavities are provided or non-magnetic material such as aluminum can be cast therein.

As shown in FIG. 3, in their non-braking positions, the magnetic poles of the magnets 32 establish therebetween an annular magnetic circuit through the shunt members 24 that does not include the brake drum 13. However, when the rotational shaft 31a is rotated clockwise a quarter turn by the motor 35 as shown in FIG. 4, magnetic circuits are established each including a magnet 32, a magnetic pole member 21, the brake drum 13, an adjacent magnetic pole member 21, an adjacent magnet 32, a magnetic pole member 22, the inner cylinder 25, and an adjacent pole member 22. Thus, when the brake drum 13 crosses the magnetic fields from the magnetic pole members 21, an eddy current is generated to provide a braking torque.

Figure 5:
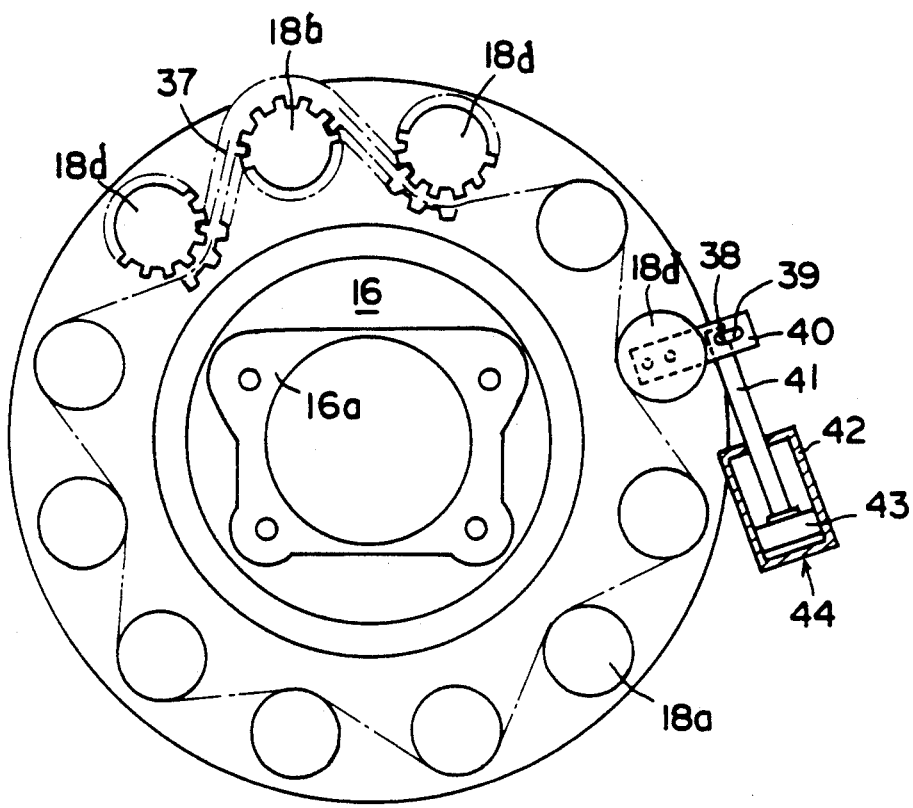
FIG. 5 is a front view showing a further embodiment of the means for rotating and driving magnets.

In the aforementioned embodiment, the means for rotating and driving the magnets 32 causes the arcuate first gears 18 coupled to alternating rotational shafts 31 to turn in one sense while the second arcuate gears 18a turn in an opposite sense. The same result can be achieved with the embodiment shown in FIG. 5, wherein an elongated flexible cog-belt 37 having teeth on both surfaces passes on opposite sides of first and second gears 18b and 18d, respectively. A slot 39 is provided in an arm 40 coupled to one of the gears 18d, and a rod 41 of an actuator 44 secured to the frame plate 16 is coupled to the slot 39 by a pin 38. Included in the actuator 44 is a cylinder 42 retaining a piston 43 defining chambers on opposite sides thereof. When pressure air is supplied to one chamber, the rod 41 connected to the piston 43 projects or withdraws, and the gears 18b and 18d are rotated in opposite directions.

Figure 6:
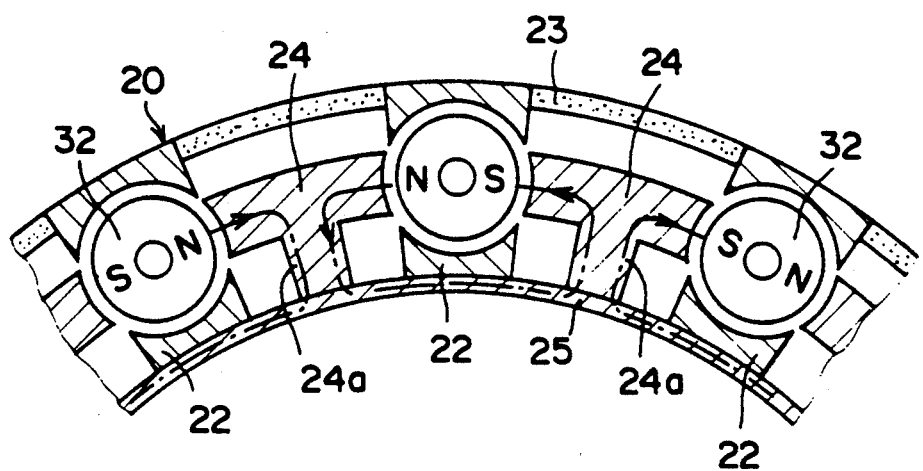
FIG. 6 is a front sectional view showing another embodiment of a magnet supporting ring.

In an embodiment shown in FIG. 6, a radially directed magnetic shunt member 24a is provided between an intermediate portion of each shunt member 24 and the inner cylinder 25. When the S and N poles of each magnet 22 are annularly aligned in non-braking directions, adjacent poles of adjacent magnets have the same polarities as shown in FIG. 6. Thus, the magnets 32 form magnetic circuits from a N-pole to S-pole via shunt members 24 and 24a, the inner cylinder 25, and adjacent shunt members 24a and 24 and excluding the brake drum 13. At the time of braking, the magnets 32 are all rotated in the same sense a quarter turn such that orientation of poles in each magnet 32 is opposed to the orientation of poles in an adjacent magnet 32. Thus, magnetic circuits are established between a magnet 32, a pole piece 21, the brake drum 13, an adjacent pole piece 21, an adjacent magnet 32, a pole piece 22, the inner ring 25 and an adjacent pole piece 22 as shown in FIG. 4. This arrangement facilitates use of a less complicated drive mechanism.

In all the above described embodiments, the switching operation between braking and non-braking positions is produced by rotation of the magnets 32 and without axial movement thereof. For that reason, the magnet supporting ring 20 can be accommodated into the brake drum 13 in a compact manner and the axial dimension of the apparatus is considerably shortened as compared with prior art structures and the apparatus is easily mounted on a vehicle.

In addition, if there is a sufficient axial dimension in a mounting space of a vehicle, braking performance can be increased by using magnets of significant length. Furthermore, by adjusting the degree of magnet rotation, the intensity of a magnetic field exerted on a brake drum can be varied whereby the braking force can be controlled depending on operating conditions.

Obviously, many modifications and variations of the present invention are possible in light of the above teachings. It is to be understood, therefore, that the invention can be practiced otherwise than as specifically described.

What is claimed is:

1. An eddy-current braking apparatus comprising:
   a brake drum having a cylindrical periphery;
   an annular support means disposed within said brake drum comprising an outer non-magnetic ring disposed within said cylindrical periphery and an inner magnetic ring disposed within said outer non-magnetic ring;
   a plurality of shafts mounted for rotation on said support means and each disposed substantially parallel to the axis of said cylindrical periphery of said brake drum, said shafts being spaced apart in an annular array on said support means; said array disposed between said outer non-magnetic ring and said inner magnetic ring;
   a permanent magnet fixed to each of said shafts directly adjacent to said brake drum and each having opposite polarity poles disposed on opposite sides of said shaft;
   drive means for producing rotation of said shafts between braking positions wherein said magnets produce magnetic circuits including said brake drum and non-braking positions wherein said magnets produce magnetic circuits substantially excluding said brake drum; and
   wherein with said shafts in said braking positions said opposite polarity poles of each said magnet are oriented substantially radially within said cylindrical periphery of said brake drum, the orientation of the poles in directly adjacent magnets are opposite, and with said shafts in said non-braking positions said opposite polarity poles of said magnets are aligned substantially parallel to said cylindrical periphery of said brake drum.

2. An apparatus according to claim 1 wherein adjacent poles of annularly directly adjacent said magnets are of opposite polarity with said shafts in said non-braking positions.

3. An apparatus according to claim 2 including a magnetic shunt means disposed between each annularly adjacent pair of said magnets and providing a magnetic circuit between said opposite polarity poles thereof.

4. An apparatus according to claim 3 wherein said drive means is adapted to produce opposite sense rotation of annularly directly adjacent pairs of said shafts.

5. An apparatus according to claim 4 wherein said drive means comprises a first annular gear disposed within said annular array, a second annular gear disposed outside said annular array, a plurality of first drive gears coupled between said first annular gear and given alternating said shafts in said annular array, and a plurality of second drive gears coupled between said second annular gear and other alternating said shafts in said annular array.

6. An apparatus according to claim 5 including a first plurality of pole pieces supported by said outer ring and each disposed adjacent to a different one of said magnets, and a second set of pole pieces supported by said inner ring and each disposed adjacent to a different one of said magnets.

7. An apparatus according to claim 4 wherein said drive means comprises a plurality of first gears, one coupled to and projecting outwardly from each alternate said shaft in said array; a plurality of second gears, one coupled to and projecting inwardly from each alternate said shaft in said array not coupled to said first gears; and a flexible elongated drive means operatively engaged with each of said first and second gears.

8. An apparatus according to claim 1 wherein adjacent poles of annularly directly adjacent said magnets are of like polarity with said shafts in said non-braking positions.

9. An apparatus according to claim 8 including a magnetic shunt means providing a magnetic path between opposite poles of each said magnet and extending radially inwardly thereof.

10. An apparatus according to claim 9 wherein said drive means is adapted to produce a common sense of rotation for all of said shafts.

11. An apparatus according to claim 10 including a first plurality of pole pieces supported by said outer ring and each disposed adjacent to a different one of said magnets, and a second set of pole pieces supported by said inner ring and each disposed adjacent to a different one of said magnets.

12. An apparatus according to claim 1 including a first plurality of pole pieces supported by said outer ring and each disposed adjacent to a different one of said magnets, and a second set of pole pieces supported by said inner ring and each disposed adjacent to a different one of said, magnets.

13. An apparatus according to claim 12 wherein each said magnet is a hollow cylinder surrounding one of said shafts.

14. An apparatus according to claim 1 wherein each said magnet is a hollow cylinder surrounding one of said shafts.

* * * * *